United States Patent

Valente

[15] 3,643,535
[45] Feb. 22, 1972

[54] CONTROL METHOD AND APPARATUS FOR A FABRICATING SYSTEM

[72] Inventor: Raymond L. Valente, Kankakee, Ill. 60901
[22] Filed: Apr. 27, 1970
[21] Appl. No.: 32,097

[52] U.S. Cl. ................................83/50, 83/71, 83/396, 83/522, 408/3
[51] Int. Cl. ................................B26d 5/32
[58] Field of Search ..................83/71, 50, 396, 522; 408/3

[56] References Cited

UNITED STATES PATENTS

| | | | |
|---|---|---|---|
| 2,852,629 | 9/1958 | Sacher | 83/71 X |
| 2,947,203 | 8/1960 | Ausenda et al. | 408/3 |
| 3,457,817 | 7/1969 | Turnbull et al. | 83/522 |

*Primary Examiner*—James M. Meister
*Attorney*—Olson, Trexler, Wolters & Bushnell

[57] ABSTRACT

Control apparatus and a method for providing fabricating apparatus of the type employed with structural members, with an automated operating cycle, where various tool means at one or more tooling stations required for the fabrication of the structural members are actuated automatically. The apparatus utilizes a programming template formed from a thin, flexible metal ribbon that is coiled about a stationary reel, having a free end thereof fixed with regard to a structural member that is moving relative to said tool means. A sensing unit, also fixed, monitors movement of the programming template and upon the detection of the occurrences, indicia on said template at a monitored point produce signals that are employed to control the various functions of the operating cycle. The relationship between the control apparatus and the remainder to the system is such that the template movement corresponds exactly to that of the structural members, so that the dimensional relationship of the patterns of operations to be performed on said members may be transferred directly to the template.

21 Claims, 7 Drawing Figures

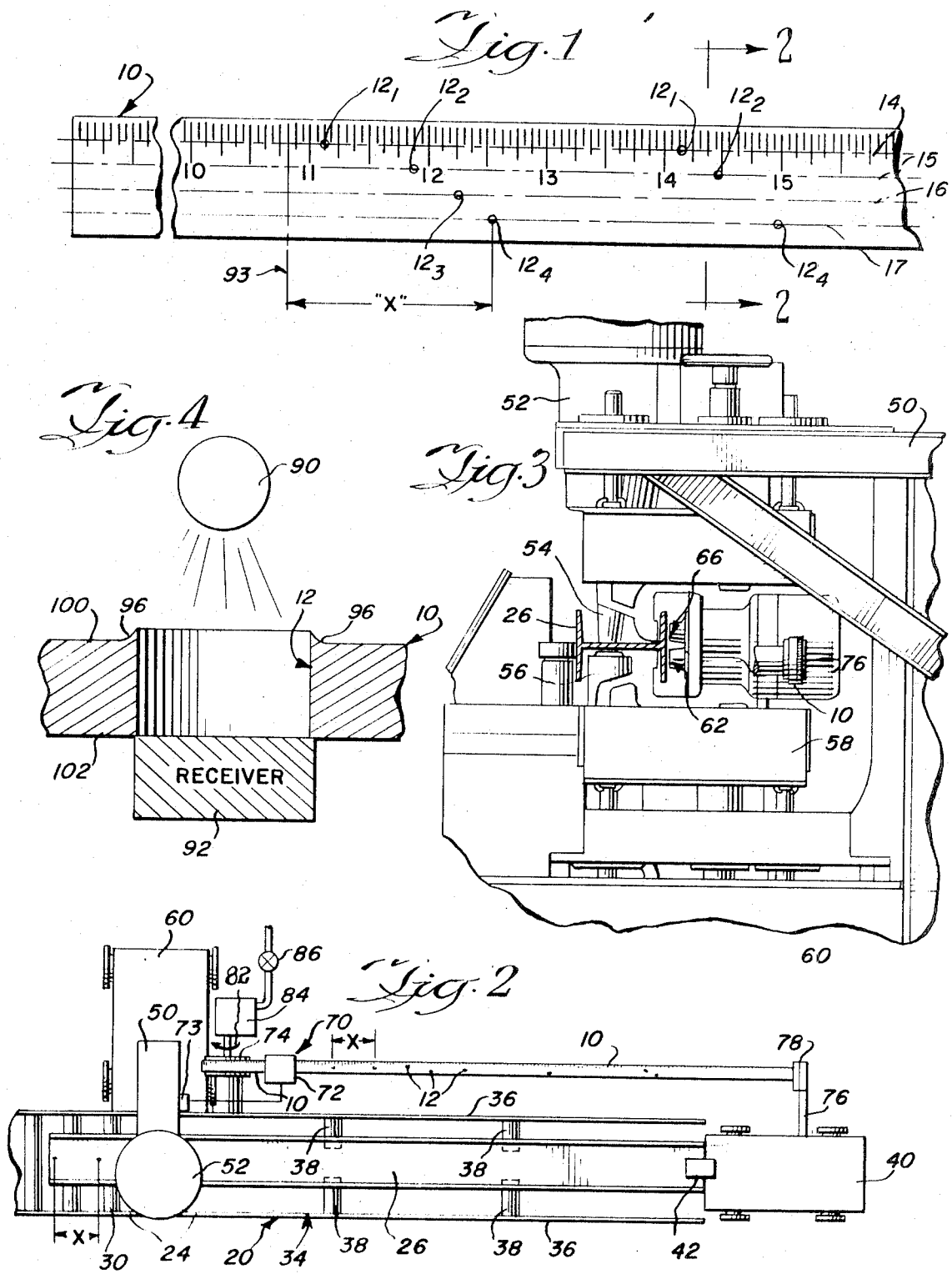

INVENTOR
Raymond L. Valente
BY Olson, Trexler, Wolters & Bushnell
ATTORNEYS

CONTROL METHOD AND APPARATUS FOR A FABRICATING SYSTEM

BACKGROUND OF THE INVENTION

This invention relates to a method and apparatus for use in the fabricating of elongate structural members or workpieces, such as plate elements, angle irons, channel irons, I-beams, or the like. More particularly, the present invention provides a novel system for performing automatically one or more tooling operations at a plurality of locations spaced longitudinally along the structural element or workpiece.

Programmed tooling or fabricating systems are known, including systems for the fabrication of structural members. However, these systems are designed primarily for high-precision work, and thus require complex and costly circuitry and programming apparatus. Accordingly, a great number of fabricators and manufactures who would like to automate their existing fabricating equipment, or purchase new programmed equipment have been dissuaded by the inherent disadvantages of the available apparatus. More specifically, with the prior art systems, the initial cost is extremely high, due to the precision programming tape driver required to correlate tape movement to workpiece movement, as well as the complex control and sensing circuitry utilized. Also, with the relative complexity of the programming means, the setup time is lengthy, thus rendering said systems economically feasible for only long production runs. Unfortunately, however, most fabricators of structural elements are confronted primarily with relatively short production runs.

Thus, for most fabricating operations where a structural member is punched, drilled, welded, or the like, the initial cost and setup expenses of the precision prior art systems cannot be justified. This is especially true since in most instances, the tolerances that are to be maintained, while critical within certain limits, do not require the precision afforded by the available apparatus.

Accordingly, not having an adequate, economically feasible system available, most fabricators are relegated to the use of a manually controlled fabricating cycle. That is, an operator controls the positioning of the workpiece relative to a tooling station, and after referring to the detailed production drawings, or some other form of guide means, he actuates the fabricating apparatus when the workpiece is in proper alignment. The workpiece is then advanced to the next location and another operation performed. However, this mode of fabrication requires the operator's constant attention, as well as repeated checks with the production drawings. As can be readily appreciated, the rate at which fabrication proceeds, as well as the accuracy of the work, depend entirely upon the operator's skill and dexterity; factors factors that will vary, not only from operator-to-operator, but also as an operator becomes fatigued.

When the various apparatus and methods of the present invention, the disadvantages of a manually controlled operating cycle are obviated, while many of the advantages of an automatic fabricating system are realized; both being accomplished without the incurrence of the extremely high cost of the prior art precision programming systems. Thus, where extremely high tolerances, i.e., one-thousandth of an inch (0.001 inch), are not required, the present invention provides a fabricating system that can be employed to augment and automate existing apparatus, as well as specially constructed units.

The above-noted features and advantages are attained primarily by the use of a novel template device and drive arrangement, which permit the programming information to be applied to said template directly in terms of the dimensioning and relationships found in the production drawings. In this regard, the template is mounted relative to the workpiece for movement therewith relative to the tooling station. It should be noted that it is possible to move the workpiece with respect to the tooling station or, conversely, to move the tooling station relative to the workpiece. In either instance, the resulting relative movement is the same. Thus, by employing stationary scanning means, each increment of movement of the workpiece relative to the tooling station results in a corresponding increment of movement of the template past the scanning means.

Accordingly, the dimensional relationships existing between the various locations on the workpiece at which the tooling operations are to be performed, are transferred directly to the template. This is done quite rapidly, and without the employment of any conversion factors, or the like, materially reducing setup time, as compared with the available systems. Also, since the drive for the workpiece effects the template movement, the expense of the precision drive arrangements employed in the prior art devices for correlating movement of a programming tape to that of the article being worked upon, is avoided, resulting in acceptable accuracy at substantially decreased cost.

More importantly, in addition to the decreased initial cost, the fact that a programming template can be prepared in rather short time, now makes short run production on an automated basis available to all fabricators.

The aforementioned programming template is constructed from a relatively thin, flexible ribbon of steel that has the programming information stored thereon. As will be apparent from the following description, both during preparation and use, the template is carried or coiled on a storage reel. Therefore, after a production run, the template may be stored for use at a later date. This feature is extremely important to those manufacturers or fabricators who employ a plurality of rather short production runs on a repetitive basis.

The selection of steel or some other metallic material for the template assures its longevity and endurance, especially in the rather contaminated environments in which it is to be used. Also, in selecting the metal for the template, a material having a coefficient of expansion similar to that of the workpiece to be processed may be used which assures an extremely high degree of dimensional stability and accuracy. That is, once the programming information is placed on the template, there is little or no danger that the changes in temperature, humidity, or other environmental factors, will vary the relationship of the programmed information with respect to the workpiece. The term "dimensional stability" is used in a relative sense, and it is to be understood that the aforementioned factors will cause the steel or metal template to expand and contract; however, these factors will effect the workpiece in a similar manner. Where the workpiece is of a material which is dissimilar to an existing template and has a higher coefficient of expansion, or does not lend itself for use as a template, for example aluminum, the present invention still provides for dimensional stability. In this regard, the slight differences in expansion between the template and the workpiece are compensated for by controlling the application of tension to the template during use to stretch it the amount required to attain proper registration. Thus, with both the template and the workpiece having similar or closely related coefficients or expansion, the programmed relationships remain substantially constant or stable for any given set of conditions, or can be easily adjusted.

DESCRIPTION OF THE DRAWINGS

FIG. 1 is a plan view of a segment of a programming template according to the present invention;

FIG. 2 is a schematic, plan view of a fabricating system employing the present invention;

FIG. 3 is an end elevational view of a tooling station of the general type presently in use with fabricating systems;

FIG. 4 is a schematic sectional view illustrating a preferred template construction and its relationship to the sensing means of said system;

DESCRIPTION OF THE ILLUSTRATED EMBODIMENT

Figure 5:
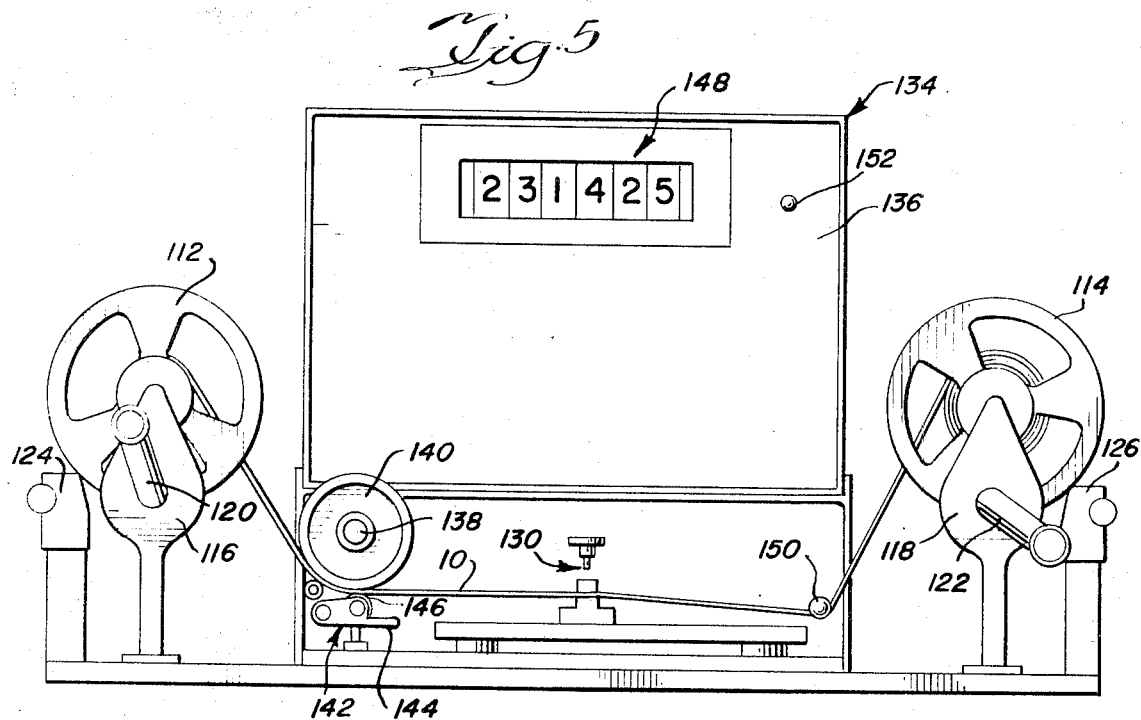
FIG. 5 is an elevational view of one form of a preferred device for programming said template.

Referring now to the drawings for a more detailed discussion of the present invention, FIG. 1 illustrates the novel template element of the present invention, which is designated generally 10. The template 10 is formed from a thin, elongate flexible metallic ribbon, and as will be discussed more completely hereinafter, includes a plurality of indicia in the form of perforations or apertures 12. Apertures 12 are arranged in a plurality of series, the apertures 12 in each series being aligned so as to extend longitudinally, parallel to the elongate edges of said template 10. In FIG. 1, four such series of apertures are illustrated, these being designated 14, 15, 16 and 17, respectively; however, it should be understood that any number of series may be employed. Each series represents or controls a particular function or element of the overall system, such that they may be termed or defined as programming channels.

Considering now FIG. 2, a typical system 20 of the type provided with the present invention is illustrated schematically. Basically, the system 20 includes a tooling station 22 that is operatively positioned with respect to a conveyor arrangement 24 for performing various fabricating operations on a structural member 26, which as illustrated is an I-beam.

The conveyor arrangement 24 includes a discharge or unloading segment 30 upon which the I-beam 26 rests after passing the tooling station 22. The opposite end of the conveyor assembly 24 comprises the loading segment 34, which cooperates with drive means used to advance the I-beam 26 toward the tooling station 22. The loading segment 34 is defined primarily by spaced parallel frame elements 36, each having a plurality of guide members 38 extending therefrom, upon which the I-beam 26 rests. A carriage 40 provides the drive means for I-beam 26. The carriage 40 is attached to the I-beam 26 by a clamp 42, or the like, and is movable between the upright frames 36, so as to pass underneath the guides 38 in advancing I-beam 26 toward the tooling station 22. With an arrangement as that illustrated in FIG. 2, the carriage 40 normally rides on a pair of parallel track elements (not shown) to assure the alignment of the I-beam 26 with the tooling station 22. However, it should be kept in mind that in place of the carriage 40, other types of drive means may be utilized, for example, a plurality of drive rollers carried by the frames 36 could be employed which engage the side surfaces of the workpiece being processed.

The drive apparatus for carriage 40 (not shown) may be of conventional design. Also, said drive apparatus may be operatively coupled to the control arrangement discussed hereinafter such that movement of carriage 40 is also determined by the template 10. In this regard, it is often desirable to employ rapid advancement of the I-beam 26 between the locations at which the tooling operations are to be performed, while anticipating the occurrence of one of said locations to slow the rate of advancement to a relatively low level or creep so as not to bypass said location.

Considering now FIG. 3, there is shown an end elevational view of a typical tooling station 22 designed for performing a plurality of fabricating operations on an I-beam 26. In this regard, the station 22 includes a cantilever-type frame 50 upon which is mounted the ram arrangement 52 for a vertically movable punch die 54. A lower stationary die element 56 is carried on a bed 58 mounted to a carriage 60 which also supports the frame 50. The respective die elements 54, 56 cooperate to form or punch apertures in the horizontal web segment of I-beam 26.

In addition, the bed 58 may also have a pair of horizontally disposed punch arrangements 60 and 62 carried thereon. The horizontal punch arrangements 60 and 62 are both disposed on the same side of the I-beam 26 for the formation of apertures in the corresponding vertical flange. A like pair of horizontal punch elements may be disposed on the opposite side of the I-beam, or for that matter, any combination, orientation, or type of tool means may be employed at the tooling station 22.

It should be understood, that the arrangement of the fabricating apparatus as illustrated in FIG. 3 for tooling station 22, is set forth merely for purposes of description. In practice, the positioning of the tooling apparatus employed may be adjustable transversely of the axis of the I-beam either horizontally or vertically, with the desired positioning for operation being achieved with the control apparatus of the present invention.

Referring again to FIG. 2, the control apparatus of the present invention will now be discussed, which is designated generally 70. As can be ascertained from the prior discussion, this apparatus 70 may be made as sophisticated as desired, and could be employed to control a wide variety of operations in the fabricating cycle. However, for purposes of description, the following will deal only with the punching of the web and flanges of I-beam 26 with the above-discussed tool means of FIG. 3.

Basically, control apparatus 70 include the template 10 which moves relative to a sensing device 72. The sensing device 72 is operatively connected to a control system 73 of known construction for the punch apparatus 54, 60 and 62, as well as for the carriage drive. Accordingly, as information on template 10 is detected or sensed, the device or means 72 produces control signals which are applied to the control system to advance the carriage intermittently, and to stop the carriage and workpiece at a desired time or point in the fabricating cycle, whereupon the punches are actuated.

Programming template 10 is carried on a reel 74 which has its position fixed with respect to the tooling station 22 and the sensing means 72. One end of the template 10 is attached to the reel 74 with a segment of said template coiled about the reel. The opposite, or free end, of template 10 is attached to an arm or bracket 76 by a clamping arrangement 78, said arm 76 being mounted on the movable carriage 40. Therefore, the free end of template 10 is, in effect, fixedly positioned with respect to the trailing end of I-beam 26, or some other reference point on said beam.

Due to the fixed positioning of reel 74 and sensing means 72 with respect to each other and tooling station 22, as the I-beam 26 is advanced or retracted, as indicated by arrow 80, template 10 will be unwound or laid back upon the reel 74. The net result of this movement of template 10 is that it will also move relative to the sensing means or device 72.

From the preceding, it can be seen that the movement of template 10 relative to sensing means 72 corresponds exactly to the movement of I-beam 26 with respect to tooling station 22. Further, and most importantly, this correlation of movement is achieved with the use of only the basic drive for carriage 40. Thus, conventional prior art fabricating presses, similar to the apparatus 20 and presently being employed by fabricators, can be automated quite readily and inexpensively with the present invention. Heretofore, this conversion from a manual to an automatic cycle was not economically feasible, one primary deterring factor being the high cost of the precision drive arrangements required to correlate the movement of a programming tape to that of the workpiece—a deterrent obviated by the instant invention.

To avoid unwanted slack both during movement of the workpiece and during the punching operation, and to assure and maintain accurate positioning of the template indicia relative to the workpiece, a constant tensioning device is employed in conjunction with storage reel 74. While various types of drives employing slip clutches or the like may be used, in the illustrated embodiment, a driving force is applied to reel 74 by an air motor 84 which tends to rotate said reel in the direction indicated by arrow 82. The air motor 84 is shown schematically in FIG. 2 and is supplied compressed air through an adjustable pressure regulator valve 86 which permits the degree of moment or force tending to rotate said reel 74 to be varied as desired. In this regard, the force applied by motor 84 must be sufficient to keep template 10 taut during movement of the carriage 40 pursuant to advancement of the workpiece. On the other hand, where there is some difference in expansion between the template 10 and workpiece 26, valve 86 can be adjusted such that air motor 84 applies additional tensile stress to template 10, sufficient to stretch same the amount required to attain proper registration.

In FIG. 4, there is illustrated schematically, a preferred form of sensing means 72 and template construction. Basically, sensing means 72 is a photoelectric device, and includes an emitter of radiant energy 90 operatively aligned with a receiver 94. Thus, upon the reception of radiant energy by receiver 94, a control pulse or signal is produced which is utilized to actuate apparatus of the overall system to perform one or more of the steps of the fabricating cycle. The template 10 closely overlies and is in sliding contact with the receiver 92, such that reception of radiant energy is possible only upon the occurrence of an aperture 12 in alignment therewith. Thus, during the major portion of the movement of template 10 over receiver 92, reception of radiant energy is precluded.

It should be understood that FIG. 4 is merely a schematic illustration and represents the relationships existing with regard to only one of the series or programming channels provided by the aperture 12. In practice, while a single emitter 90 may be employed, separate receivers 92 are used for each channel or series of apertures so a wide variety of functions in the operating cycle may be controlled by template 10.

Considering again the schematic illustration of FIG. 2, a brief description of the operation of system 20 will now be given. In this regard, it will be assumed that the template 10 has been preprogrammed as shown in FIG. 1, and is in position as illustrated. Various other features and aspects of the present invention pertaining to the construction of template 10 and the means or apparatus for forming the programming perforations 12 therein will be discussed more fully in relation to FIGS. 5, 6 and 7.

Initially, the I-beam 26 is placed on the infeed segment of the conveyor arrangement 24 in supported engagement with elements 38. The carriage 40 is then moved into position and clamped to the I-beam by use of the carriage clamp 42. The reel 74 containing the coiled programmed template 10 is then mounted in position and the template 10 properly positioned with regard to the sensing means 72 by disposing it intermediate the emitter 90 and receiver 92 as shown in FIG. 4. Next, the free end of template 10 is connected to the carriage arm 76 by clamp 78. Once this basic or initial setup is attained, the fabricating system or apparatus 20 is ready for operation.

The operator, at this point, need merely initiate the fabricating cycle which will progress automatically until all tooling operations to be performed on the workpiece or I-beam 26 are completed. Initially, the carriage 40 will commence to move toward the tooling station 22, and as discussed previously, this movement in conjunction with the drive force being applied to the reel 74 by the air motor 84, causes the taut template 10 to move relative to the sensing means 72.

Referring now to FIG. 1, the function of the various series or channels of indicia, 14–17, provided by the apertures 12 will be considered, assuming each to control a function of the fabricating cycle as discussed hereinafter. In this regard, the drive apparatus for carriage 40 (not shown) will advance the I-beam 26 at a predetermined rate. However, as soon as the sensing means 72 detects the aperture $12_1$ of channel 14, a control pulse is produced, slowing down the rate of advancement. Upon the sensing of the aperture $12_2$ of channel 15, the sensing means 72 will further reduce the rate of movement of carriage 40 to a creep in anticipation of a forthcoming tooling operation. The apertures $12_3$ of series 16, control the web punches 54 and 56, while the apertures $12_4$ of series 17, control the flange punching apparatus 60 and 62. Thus, when said apertures $12_3$ or $12_4$ are aligned with the receiver 92, carriage 40 is stopped and the tool means are energized to perform the tooling operation.

A time delay mechanism or the like is built into the overall control system, such that after completion of the tooling operation, the carriage 40 is again advanced at its normal rate. Thus, as the template passes through the sensing means 72, the sequence of operation programmed into the template 10 will be repeated until the fabrication cycle is completed at which time the system is automatically deenergized and is now ready to accommodate the next workpiece of the production run.

Thus, it is believe apparent from the foregoing that since there is a direct correlation between movement of the I-beam 26 past the tooling station 22 and the movement of template 10 past sensing means 72, the positioning of the various apertures 12 on said template will conform exactly to the dimensional relationships of the locations on the workpiece 26 where the tooling operations are to be performed. For example, if a hole is to be punched in the I-beam web portion at a location spaced a distance "X," FIG. 2, from the leading edge of the I-beam 26, the spacing of the first aperture $12_3$ of channel 16 from a datum line 93 representing said leading edge, will be exactly equal to the distance "X." Accordingly, the apertures $12_1$ and $12_2$, which are to anticipate the operation to be performed are spaced slightly ahead of the aperture $12_3$. Thus, in programming the template 10, the dimensional relationships on the design drawing can be transferred directly to the template 10 without the employment of any conversion factors or the like.

In the preparation of the template 10, a hypothetical datum line 93 is chosen to represent the leading edge of the I-beam from which the location of the apertures 12 will be measured. As illustrated in FIG. 2, it can be seen that various parameters of the system 20 must be taken into consideration, for example, the spacing of the sensing means 72 from the tooling station, as well as the limits of movement of the carriage 40. However, these parameters are constant for a given system so that once worked out, they will remain the same for the programming of all templates.

Figure 6:
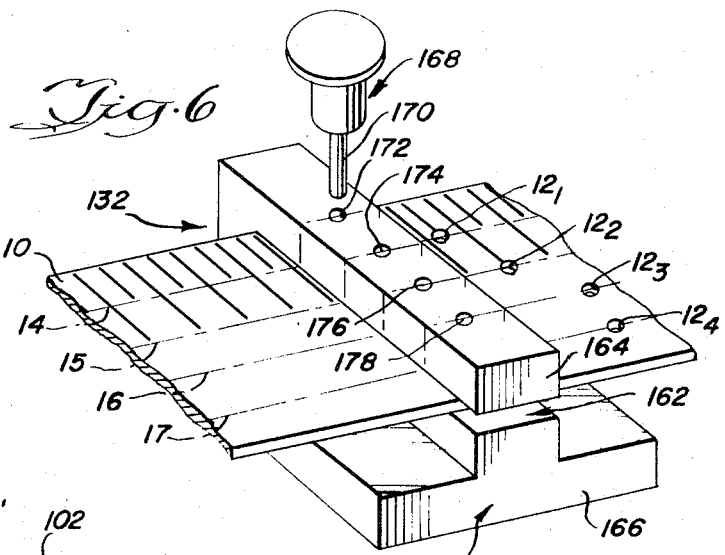
FIG. 6 is a perspective view of the template perforating station of the device of FIG. 5, illustrating the manner in which a plurality or series of perforations are formed in the template.
Figure 7:
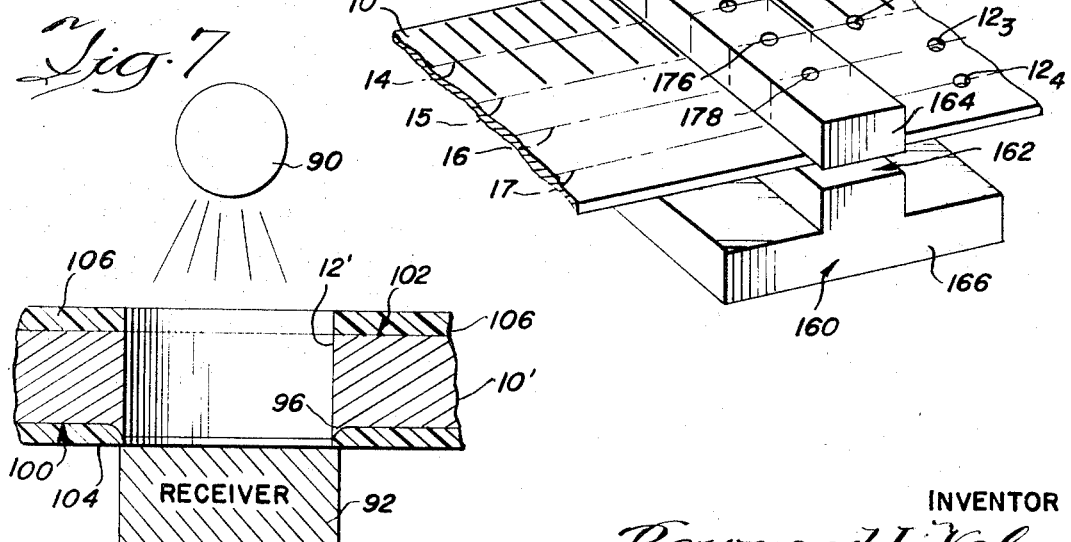
FIG. 7 is a schematic sectional view similar to FIG. 4, illustrating a modified template construction.

Before discussing the tape-punching apparatus of FIGS. 5 and 6, the two disclosed template constructions of FIGS. 4 and 7 will be considered. In this regard, it will be recalled that the template 10 is fabricated from a steel ribbon. Thus, when the steel ribbon is punched to form the apertures 12, a burr 96 generally will result around the periphery of said apertures on the template surface opposite that first engaged by a movable punch member. It has been found that engagement of these burrs against the receiver 92, causes the transparent upper surface of said receiver to become scratched due to the constant scraping thereof. When this happens, the sensitivity of the receiver is adversely effected.

In accordance with features of the present invention, the template constructions of FIGS. 4 and 7, with the former being preferred, are used whereby damage to the receiver is prevented. Regarding the construction of FIG. 4, it can be seen that the template 10 is programmed and employed such that the burrs 96 extend from the surface 100 while the opposed bottom surface 102, which contacts the receiver 92, is relatively smooth and burr-free. The template 10 is formed in accordance with the method described below so that when assembled in the apparatus, its orientation is reversed from that employed during punching.

In FIG. 7, an alternate template construction 10' is illustrated. In this instance, the template 10' is oriented with respect to the receiver in the disposition as originally punched, i.e., with the burrs extending downwardly. However, subsequent to punching, the surface 100' has a plastic or resinous coating 104 applied thereto which prevents the burrs 96 from scratching the exposed upper surface of the receiver 92. In addition, the opposite surface 102' of template 10' may also have a resinous coating 106 applied thereon. This coating 106 is advantageous in that it provides means whereby the operator or the template programmer may inscribe notes or the like on the tape. Also, should the tape be of the type shown in FIG. 1, having a measuring scale reproduced thereon, a resinous coating will prevent this scale from wearing off during use.

Considering now FIGS. 5 and 6, a preferred device for punching the programming apertures 12 in template 10 is illustrated, and designated generally 110. Said apparatus 110 include a pair of reels 112 and 114 rotatably mounted on brackets 116 and 118. Hand cranks 120 and 122 are provided for each reel to facilitate rotation thereof. In addition, each said reel has a precision feed arrangement, 124 and 126, respectively associated therewith so as to provide for accurate control of template movement.

The apparatus 110 also includes a punch arrangement 130, the operation of which will be discussed more fully with regard to FIG. 6. As can be seen, the respective end portions of the flexible steel ribbon template 10 are attached to the reels 112 and 114, with a segment thereof extending between said reels, which segment is operatively engaged with the punch arrangement 130. Therefore, upon rotation of one or the other of said reels 112, 114 in the clockwise direction, the template 10 will move past punch arrangement 130 in the direction indicated by the arrow 132.

For accurately measuring the movement of the template 10, the programming apparatus 110 utilizes a measuring arrangement 134. The measuring arrangement 134 has its position fixed relative to the punch 130, so that movement of the template past each is at the same rate. Arrangement 134 is comprised essentially of an encoder 136 that includes a shaft 138 having a measuring roll 140 mounted thereon. Spaced immediately below the measuring roll 140 and in alignment therewith is a spring biased capstan assembly 142. The assembly 142 includes a bifurcated bracket 144 to which is mounted a rotatable capstan member 146. Accordingly, with the template 10 threaded between and engaged by the measuring roll 140 and the capstan roller 146, any movement of the template 10 in the direction indicated by the arrow 132 will cause a corresponding rotation of roll 140 in the counterclockwise direction.

The relationship between the measuring roll 140, shaft 138 and the encoder 136 is such that for each revolution of roll 140 and shaft 138, a prescribed number of electronic pulses are produced. These pulses are automatically counted and visually displayed by a readout device 148, of said encoder. Accordingly, assuming that the measuring roll 140 has a circumference of 10 inches, and the encoder 136 produces 100 pulses for each revolution of the shaft 138, it can be seen that each pulse counted represents the movement of one-tenth of an inch (0.1 inch) of template past the measuring roll and correspondingly past punch 130. In practice, the sensitivity of this device may be varied as desired.

In FIG. 6, a preferred form of punch means 130 is disclosed. In this regard, the said means 130 include a punch block 160 that is slotted at 162 to accommodate the template 10, said slot 162, in effect, dividing the punch block 160 into an upper segment 164 and a lower segment 166. The respective segments 164 and 166 each have a plurality of aligned passages formed therein, which open to slot 162, only those in the upper block portion 164 being visible, in FIG. 6. A punch element 168 is provided which includes an elongate die 170 receivable in the passages of the punch block 160. Thus, by disposing the die segment 170 in one of said passages and then forcing the punch member 168 downwardly, a perforation will be formed in the template 10. It should be noted that this template 10 is extremely thin, on the order of two-thousandths of an inch (0.002 inch), such that the program perforations 12 are easily formed.

The punch die receiving passages starting with that disposed immediately below punch 168 in FIG. 6, are designated 172, 174, 176 and 178, respectively. The spacing between said passages 172–178 is such that they align with the programming channels 14–17, respectively, on the template 10. Therefore, the punch block passage 172 will be utilized in the formation of the programming perforations $12_1$ and the remaining punch block apertures employed corresponding to form the performations $12_2$, $12_3$ and $12_4$ in the channels 15, 16 and 17, as illustrated in FIG. 6.

When it is desirable to program the template 10 with the device 110, the various parameters of the system are taken into consideration in the selection of the hypothetical datum line 93 representing the leading edge of the workpiece, such that the template 10 can be uncoiled from the reel 112, threaded past the measuring roll 140 and through punch 130, engaged over capstan 150 and attached to the reel 114. Next, the reels are rotated in a clockwise direction to cause the template to move in a direction indicated by arrow 132 until the datum line 93 is aligned with punch arrangement 130. At this point, a reset button 152 for the encoder 136 is depressed to index the readout device 148 to zero. Accordingly, having the production drawings before him, the programmer will advance the template to the first position for punching which, assuming the mode of operation previously discussed would be the placement of an aperture $12_1$ in the programming channel 14 at a distance from the datum line 93 slightly less than the distance "X." The template 10 is then advanced slightly to the proper location for the placement of the aperture $12_2$ which is formed in the programming channel 15 by the punch arrangement 130. Again, the distance from the datum line 93 to the aperture $12_2$ will be less than the distance "X." The template is advanced still further until the readout arrangement 148 corresponds to the distance "X" at which point apertures $12_3$ and $12_4$ are formed in the programming channels 16 and 17. This programming procedure is repeated as required by the pattern of holes to be formed on I-beam 26, until the template 10 is completely punched, at which time it is coiled about the reel 114.

Recalling the prior discussion concerning the burrs 96 formed during punching, it will be seen that the template 10 will have to be either coated as shown in FIG. 7, or inverted as shown in FIG. 4, before it can be utilized with sensing means 72 disposed as shown in FIG. 4.

With the arrangement of device 110 illustrated in FIG. 5, the template is punched while moving from left to right as viewed. However, it will be appreciated that this arrangement could be reversed and the template punched while moving from right to left.

Irrespective of which orientation is chosen, care must be taken to insure the proper punching of the template channels 14–17. With the arrangement as discussed in FIGS. 5 and 6, the template 10 must be inverted when transferred to a system oriented similar to the system 20 of FIG. 2. This is the case, since the template 10 is punched while moving in an opposite direction to that employed during movement past the sensing means 72.

However, the same results can be attained should the apparatus of FIG. 5 be used to punch a template moving relative to the punch arrangement 130 in a direction opposite to that indicated by arrow 132. In this instance, however, the programming channels to be presented by the various apertures in the punch block would be reversed from that of FIG. 6, in order to insure proper positioning after the template 10 is inverted. In any event, when an uncoated template is used as shown in FIG. 4, care must be taken to form the apertures by engaging the punch initially with the back or bottom side of the finished template or, in other words, with the side of the template which is to be engaged against the receiver 92, whereby the burrs 96 will project away from the receiver.

From the above, it is believed clear that the present invention affords an automated fabricating system that, due to the low initial cost and reduced setup time, can be used for both long and short run productions. While the preceding description has been set forth specifically with regard to the drawings and the particular type of tool means, or the like, shown therein, it is intended that various changes, modifications or substitutions may be employed, without departing from the spirit and scope of the invention as defined in the claims appended hereto.

What is claimed is:

1. Apparatus for use in a fabricating cycle for an elongate workpiece, wherein a plurality of tooling operations are performed at prescribed locations along the length of said workpiece, said apparatus comprising: support means for said workpiece; a tooling station associated with said support means, and including tool means for performing said tooling operations on said workpiece; drive means producing relative movement of said workpiece with respect to said tooling station; and control means for actuating said tool means at prescribed points in said cycle as a function of the relative movement between said workpiece and the tooling station, said control means including: a dimensionally stable, elongate, relatively thin template having at least one series of indicia carried therein and extending longitudinally thereof, with the spacing of said indicia forming a reference location on said template corresponding to the spacing of locations along the workpiece at which said tooling operations are to be performed; a storage reel having one end of said template attached thereto, said reel being fixedly positioned with respect to said tool means and adapted to have said elongate template coiled thereon; sensing means fixedly positioned, and operatively connected with respect to said tool means; and means for fixing the position of the other, free end of said template with respect to an end of the workpiece, such that movement of said workpiece produces correlated movement of the template relative to the sensing means; said sensing means being associated with said template for detecting the occurrence of one of said indicia at a monitored point during said movement, and producing a control signal for said tool means upon each said occurrence.

2. Apparatus as defined in claim 1 wherein said template is fabricated from a metallic ribbon having a coefficient of expansion approximating that of said workpiece, and said indicia are apertures formed in said template, such that environmental changes will not effect the relationship between the spaced template apertures and the workpiece locations at which the tooling operations are to be performed.

3. Apparatus as defined in claim 1, further including constant tension means for applying a tensile stress to said template during movement thereof relative to said sensing means.

4. Apparatus as defined in claim 3 wherein said constant tension means include an air motor for driving said storage reel in a direction tending to coil said template thereon, while permitting said template to be unwound where necessary.

5. Apparatus as defined in claim 1 wherein said template has a plurality of said series of indicia, the indicia of each series being aligned parallel to the edges of said template, such that a plurality of programming channels are provided, each said channel adapted to be employed to control a specific function at selected points in the fabricating cycle.

6. Apparatus as defined in claim 1 wherein said sensing means include, a source of radiant energy, and a receiver element producing a control signal upon the reception of said radiant energy, said template having indicia in the form of apertures and a surface slidably engaged over said receiver to preclude said reception except during an occurrence of alignment of one of said indicia with said receiver.

7. Apparatus as defined in claim 6 wherein the template has the apertures formed therein such that the burrs resulting from the forming thereof extend from the surface, opposite that surface engaged with the receiver element.

8. Apparatus as defined in claim 6 wherein said template includes a resinous coating on said surface which engages said receiver, said coating being applied subsequent to the formation of said apertures and covering any burrs which may have been formed to preclude damage to said receiver during movement of the template thereover.

9. Apparatus as defined in claim 8, further including a resinous coating applied to the surface of said template opposite that engaged with said receiver, said coating providing means whereby reference information may be applied to said template.

10. Apparatus for use in the performance of a plurality of tooling operations at prescribed locations along the length of an elongate workpiece, said apparatus said apparatus comprising: support means for said workpiece; fabricating apparatus associated with said support means for performing said tooling operations on said workpiece; means producing movement of said workpiece with respect to said fabricating apparatus; and control means for actuating said fabricating apparatus as a function of said relative movement when said fabricating apparatus is in alignment with one said location, said control means including: a dimensionally stable, elongate, relatively thin template having at least one series of apertures punched therein along its length, with the spacing of said apertures forming a reference location on said template corresponding to the spacing between the workpiece locations at which said tooling operations are to be performed; sensing means operatively engaged with said template and fixedly positioned with respect to said fabricating apparatus while being operatively connected thereto: and means for producing movement of the template with respect to said sensing means as a result of the movement of said workpiece relative to said fabricating apparatus, said means including at least one storage reel adapted to have the template coiled thereon and being fixedly positioned relative to said fabricating apparatus and said sensing means, and means for fixedly positioning a free end of said template with respect to an end of said workpiece for movement therewith; such that said sensing means detect the occurrence of said apertures at a monitored point and produce a control signal for said fabricating apparatus upon each said occurrence.

11. Control apparatus for use in providing fabricating apparatus with an automatic fabricating cycle wherein a plurality of tooling operations are performed at prescribed locations along the length of an elongate workpiece, said fabricating apparatus being of the type including; support means for a workpiece, metal-working apparatus associated with said support means for performing tooling operations on a workpiece, and drive means for producing relative movement of said workpiece with respect to said metal working apparatus; said control apparatus effecting the operation of the metal working apparatus and the drive means as a function of said relative movement, such that said metal-working apparatus is actuated when in alignment with one said location, said control apparatus including: a dimensionally stable, elongate, relatively thin template having at least one series of perforations punched therein along its length, with the spacing of said perforations forming a reference location on said template corresponding to the spacing of said locations along the workpiece at which said tooling operations are to be performed; a storage reel having one end of the template attached thereto, said reel adapted to be fixedly positioned with respect to said metal working apparatus with said elongate template coiled thereon; sensing means adapted to be fixedly positioned and operatively connected with respect to said fabricating apparatus; means for fixedly positioning the other, free end of said template relative to the workpiece for movement therewith, such that said movement will produce movement of the template relative to the sensing means; and said sensing means being capable of detecting the occurrence of said perforations at a monitored point as said template moves relative thereto, and producing a control signal for said fabricating apparatus upon each said occurrence.

12. Control apparatus as defined in claim 11 wherein said template is fabricated from a metallic ribbon having a coefficient of expansion approximating that of said workpiece, such that environmental changes will not effect the relationship between the spaced template perforations and the workpiece locations at which the tooling operations are to be performed.

13. Control apparatus as defined in claim 11 further including constant tension means for applying a tensile stress to said template during movement thereof relative to said sensing means.

14. Control apparatus as defined in claim 13 wherein said constant tension means include an air motor for driving said storage reel in a direction tending to coil said template thereon.

15. Apparatus as defined in claim 11 wherein said sensing means include, a source of radiant energy, and a receiver element producing a control signal upon the reception of said radiant energy, said template having a surface slidably engaged over said receiver to preclude said reception, except during an occurrence of alignment of one of said perforations with said receiver.

16. A method of providing a fabrication cycle for the processing of an elongate workpiece wherein a plurality of tooling operations are performed thereon at selected locations along the length of said workpiece, said method comprising the steps of:
1. providing support means for said workpiece;
2. providing a tooling station associated with said support means and including tool means for performing said tooling operations;
3. effecting movement of said workpiece relative to said tooling station;
4. and controlling operation of said tool means during said cycle as a function of said relative movement, which step includes further;
   a. providing a dimensionally stable, elongate, relatively thin template having a series of indicia carried therein at preselected points, which indicia correspond to the points in said cycle at which operation of said tool means is to take place;
   b. providing a storage reel and sensing means for said template, which sensing means is operatively connected to the tool means for the actuation thereof;
   c. fixedly positioning one end of said template with respect to one end of the workpiece while attaching the other end of said template to said storage reel with said template operatively engaged with said sensing means, such that movement of the workpiece relative to said tooling station produces relative movement between said template and said sensing means;
   d. employing said sensing means to monitor the occurrence of said template indicia at a prescribed location fixed relative to said tooling station, and producing a control signal at each said occurrence which is applied to said tool means to operate same.

17. A method as defined in claim 16 further including the steps of: providing a plurality of series of indicia on said template to define a like number of programming channels; and monitoring the occurrence of the indicia of each said channel at said prescribed location with said sensing means to attain a plurality of control signals.

18. A method as defined in claim 16 wherein said indicia are in the form of apertures and said sensing means is a photoelectric device, said method further including the step of, orienting said template such that any surface thereof in contact with a receiver element of said photoelectric device is free from any burrs, or the like, resulting during formation of said apertures.

19. An apparatus for use in the performance of a tooling operation at a prescribed location along the length of an intermittently movable workpiece, the combination comprising support means, means on said support means for mounting a reel adapted to have wound thereon a dimensionally stable, elongate and flexible template having an indicia thereon at a location corresponding to the prescribed location on the workpiece, said template being adapted to extend from the reel and to have a free end thereof operatively connected with and movable in response to movement of the workpiece, movement of the template and of the workpiece being stopped during a tooling operation, means on said support means for sensing said indicia and providing a signal to initiate the tooling operation, and means interconnected with said reel, mounting means for applying a substantially constant tensile stress to the template both while the template is moving and while the template is stopped whereby accurately to locate the template indicia with respect to said prescribed location on the workpiece.

20. A combination as defined in claim 19 wherein said last-named means comprise an air motor connected with said reel mounting means and valve means for supplying air under substantially constant pressure to the air motor.

21. A combination as defined in claim 19 wherein said last-named means include adjustment means for increasing or decreasing the tensile stress applied to said template, whereby said template may be stretched in order to compensate for slight variances in the dimensional relationship existing between said indicia and the prescribed locations on the workpiece resulting from the difference in the coefficients of expansion of said template and the workpiece.

* * * * *